United States Patent
Makino et al.

(10) Patent No.: US 9,267,426 B2
(45) Date of Patent: Feb. 23, 2016

(54) INTERNAL COMBUSTION ENGINE WASTEGATE VALVE CONTROLLER

(71) Applicant: MITSUBISHI ELECTRIC CORPORATION, Chiyoda-ku, Tokyo (JP)

(72) Inventors: Tomokazu Makino, Tokyo (JP); Michihisa Yokono, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 328 days.

(21) Appl. No.: 13/917,875

(22) Filed: Jun. 14, 2013

(65) Prior Publication Data

US 2014/0060041 A1  Mar. 6, 2014

(30) Foreign Application Priority Data

Aug. 29, 2012 (JP) ................................. 2012-188419

(51) Int. Cl.
```
F02D 23/00    (2006.01)
F02B 37/12    (2006.01)
F02B 37/18    (2006.01)
F02D 41/00    (2006.01)
```

(52) U.S. Cl.
CPC .............. *F02B 37/127* (2013.01); *F02B 37/18* (2013.01); *F02D 41/0007* (2013.01); *F02D 2200/101* (2013.01); *F02D 2200/602* (2013.01); *F02D 2250/34* (2013.01); *Y02T 10/144* (2013.01)

(58) Field of Classification Search
CPC .... F02B 37/127; F02B 37/18; F02D 41/0007; F02D 2250/34; F02D 2200/101; F02D 2200/602; Y02T 10/144

USPC ...................................... 60/602; 701/102–104
See application file for complete search history.

(56) References Cited

U.S. PATENT DOCUMENTS

| | | | | |
|---|---|---|---|---|
| 2,456,765 | A * | 12/1948 | Borell | 60/602 |
| 2,627,370 | A * | 2/1953 | Crum | 60/602 |
| 7,426,828 | B2 * | 9/2008 | Carbonne et al. | 60/602 |
| 7,434,397 | B2 * | 10/2008 | Hasegawa | 60/602 |
| 7,562,527 | B2 * | 7/2009 | Eiraku | 60/602 |
| 7,677,227 | B2 * | 3/2010 | Sagisaka et al. | 60/600 |
| 8,515,647 | B2 * | 8/2013 | Panciroli et al. | 60/602 |
| 2006/0213194 | A1 | 9/2006 | Hasegawa | |

(Continued)

FOREIGN PATENT DOCUMENTS

| | | | | |
|---|---|---|---|---|
| FR | 2903147 A1 * | 1/2008 | | F02D 23/00 |
| JP | 2006-274831 A | 10/2006 | | |
| WO | 2011114448 A1 | 9/2011 | | |

OTHER PUBLICATIONS

Communication dated Jun. 30, 2015 from the Chinese Intellectual Property Office issued in corresponding application No. 201310326630.3.

*Primary Examiner* — Thai Ba Trieu
(74) *Attorney, Agent, or Firm* — Sughrue Mion, PLLC (57) ABSTRACT

A desired wastegate valve opening degree is set in accordance with a driving condition of an internal combustion engine; based on a detected rotation speed of the internal combustion engine and a set desired wastegate valve opening degree. An ECU determines whether or not supercharging air to the internal combustion engine is required. If the supercharging air is not required and if the opening degree of the wastegate valve becomes a desired valve, a driving current supplied to the wastegate actuator from a wastegate valve driving unit is stopped.

3 Claims, 11 Drawing Sheets

(56) References Cited

U.S. PATENT DOCUMENTS

| | | |
|---|---|---|
| 2007/0022752 A1* | 2/2007 | Carbonne et al. ............... 60/600 |
| 2010/0077745 A1* | 4/2010 | Robinson ........................ 60/602 |
| 2012/0085092 A1 | 4/2012 | Hotta et al. |
| 2013/0283782 A1* | 10/2013 | McConville et al. ........... 60/603 |
| 2013/0312406 A1* | 11/2013 | Landsmann .................... 60/602 |
| 2014/0102092 A1* | 4/2014 | Karnik et al. ................... 60/602 |
| 2014/0325982 A1* | 11/2014 | Maruo et al. .................... 60/602 |
| 2015/0059337 A1* | 3/2015 | Wang et al. ..................... 60/602 |

\* cited by examiner

|  | ROTATION SPEED[r/min] | | | | | |
|---|---|---|---|---|---|---|
|  | 1000 | 2000 | 3000 | 4000 | 5000 | 6000 |
| ACCELERATOR OPENING DEGREE[%] 10 | 100 | 100 | 100 | 100 | 100 | 100 |
| 20 | 100 | 100 | 100 | 100 | 120 | 120 |
| 30 | 100 | 100 | 100 | 100 | 120 | 140 |
| 40 | 120 | 120 | 120 | 120 | 140 | 180 |
| 50 | 120 | 140 | 140 | 120 | 160 | 180 |
| 60 | 120 | 140 | 140 | 140 | 160 | 200 |
| 70 | 120 | 160 | 180 | 180 | 200 | 200 |
| 80 | 120 | 160 | 180 | 180 | 220 | 200 |
| 90 | 140 | 180 | 200 | 200 | 220 | 240 |
| 100 | 140 | 200 | 220 | 220 | 240 | 240 |

FIG. 5

|  | ROTATION SPEED[r/min] | | | | | |
|---|---|---|---|---|---|---|
|  | 1000 | 2000 | 3000 | 4000 | 5000 | 6000 |
| DESIRED SUPERCHARGING PRESSURE[kPa] 100 | 30 | 20 | 30 | 40 | 45 | 50 |
| 120 | 20 | 20 | 30 | 40 | 45 | 50 |
| 140 | 10 | 10 | 25 | 40 | 45 | 50 |
| 160 | 5 | 5 | 15 | 30 | 40 | 50 |
| 180 | 0 | 0 | 10 | 20 | 30 | 40 |
| 200 | 0 | 0 | 0 | 10 | 20 | 30 |
| 220 | 0 | 0 | 0 | 0 | 10 | 20 |
| 240 | 0 | 0 | 0 | 0 | 0 | 10 |

FIELDS UPPER THIS LINE INDICATE THE SAME EFFECT AS THAT AT A TIME WHEN W/G VALVE IS FULLY OPENED (SUPERCHARGING THROUGH CLOSING W/G VALVE IS NOT REQUIRED)

FIG. 6

| | | OFFSET AMOUNT [%] |
|---|---|---|
| DESIRED W/G VALVE OPENING DEGREE [%] | 0 | 0 |
| | 10 | 2 |
| | 20 | 4 |
| | 30 | 4 |
| | 40 | 5 |
| | 50 | 5 |
| | 60 | 5 |
| | 70 | 6 |
| | 80 | 6 |
| | 90 | 8 |
| | 100 | 8 |

|  | ROTATION SPEED[r/min] | | | | | |
|---|---|---|---|---|---|---|
|  | 1000 | 2000 | 3000 | 4000 | 5000 | 6000 |
| ACCELERATOR OPENING DEGREE[%] 10 | 5 | 5 | 10 | 15 | 20 | 20 |
| 20 | 5 | 10 | 15 | 20 | 25 | 30 |
| 30 | 10 | 15 | 20 | 25 | 30 | 40 |
| 40 | 15 | 20 | 25 | 30 | 40 | 50 |
| 50 | 20 | 25 | 30 | 40 | 50 | 60 |
| 60 | 25 | 30 | 40 | 50 | 60 | 70 |
| 70 | 30 | 40 | 50 | 60 | 70 | 80 |
| 80 | 40 | 50 | 60 | 70 | 80 | 90 |
| 90 | 50 | 60 | 70 | 80 | 90 | 100 |
| 100 | 60 | 70 | 80 | 90 | 100 | 100 |

FIG. 11

|  | ROTATION SPEED[r/min] | | | | | |
|---|---|---|---|---|---|---|
|  | 1000 | 2000 | 3000 | 4000 | 5000 | 6000 |
| DEMAND TORQUE [Nm] 10 | 30 | 20 | 30 | 40 | 45 | 50 |
| 20 | 30 | 20 | 30 | 40 | 45 | 50 |
| 30 | 30 | 20 | 30 | 40 | 45 | 50 |
| 40 | 30 | 20 | 30 | 40 | 45 | 50 |
| 50 | 20 | 20 | 30 | 40 | 45 | 50 |
| 60 | 10 | 10 | 25 | 40 | 45 | 50 |
| 70 | 5 | 5 | 15 | 30 | 40 | 50 |
| 80 | 0 | 0 | 10 | 20 | 22 | 25 |
| 90 | 0 | 0 | 5 | 10 | 10 | 10 |
| 100 | 0 | 0 | 0 | 0 | 0 | 0 |

FIELDS UPPER THIS LINE INDICATE THE SAME EFFECT AS THAT AT A TIME WHEN W/G VALVE IS FULLY OPENED (SUPERCHARGING THROUGH CLOSING W/G VALVE IS NOT REQUIRED)

INTERNAL COMBUSTION ENGINE WASTEGATE VALVE CONTROLLER

BACKGROUND OF THE INVENTION

1. Field of the Invention

The present invention relates to a wastegate valve controller provided in an internal combustion engine including a supercharger such as a turbo charger.

2. Description of the Related Art

To date, there has been known a technology in which in order to raise the output of an internal combustion engine, a turbo charger is provided in the intake path of the internal combustion engine and in which intake air in the intake path is supercharged with the turbo charger so as to be supplied to the internal combustion engine. A turbo charger is to rotate a turbine with exhaust gas from an internal combustion engine and apply pressure to air to be supplied to the internal combustion engine; however, when the internal combustion engine is under the condition of a high rotation and a high load, the supercharging pressure may unnecessarily increase, thereby breaking the internal combustion engine.

Accordingly, in general, an exhaust gas bypass for bypassing part of exhaust gas to be supplied to the turbine is provided in an exhaust path, and the amount of bypassed exhaust gas that enters the exhaust gas bypass is controlled with a wastegate valve (also referred to as a W/G valve, hereinafter) so that the inflow amount of the exhaust gas to the turbine is adjusted, thereby controlling the intake air pressure (supercharging pressure) to be at an appropriate level.

In general, a W/G valve is driven by use of a positive-pressure actuator. This actuator is coupled with an intake path of an internal combustion engine, especially, with an intake path at the upstream side of a throttle valve, the pressure in which particularly increases; when the pressure in the intake path of the internal combustion engine becomes higher than the atmospheric pressure, the operation of the actuator is enabled.

In general, the W/G valve is kept off until the operation of the actuator is enabled.

With the configuration of a conventional W/G valve controller formed as described above, the W/G valve cannot be operated unless the pressure in the intake path of the internal combustion engine increases; therefore, when the pressure in the intake path is the same as or lower than a predetermined value, the W/G valve cannot be operated even if there exists a demand for changing the W/G valve opening degree.

Accordingly, in recent years, there has been proposed a system in which there is adopted an electric W/G drive method in which a W/G valve is driven by a motor and, regardless of the pressure in the intake path, the W/G valve is operated when required so that the supercharging by the turbo charger is limited, thereby improving the gasoline mileage (refer to, for example, Patent Document 1). The conventional apparatus makes it possible that when the load on the internal combustion engine is low, the opening degree of the W/G valve is increased to lower the exhaust pressure and to reduce the pump loss of the turbo charger so that the conventional apparatus can contribute to improvement of the gasoline mileage.

PRIOR ART REFERENCE

Patent Document

[Patent Document 1] Japanese Patent Application Laid-Open No. 2006-274831

Because the conventional W/G valve disclosed in Patent Document 1 is controlled by a current, energization is required when the W/G valve is fixed at a desired opening degree position; thus, although no description concerning power consumption exists in Patent Document 1, electric power, which has not been required originally, may be consumed. In Patent Document 1, there is a description saying that it is desirable that the opening degree of a W/G valve is controlled to be at 50 to 80[%] (0[%] signifies "fully closed", and 100[%] signified "fully opened"); however, it is experimentally confirmed that when the load is low (when the exhaust quantity is small), the supercharging pressure is likely to increase when the opening degree is controlled to be at 20[%] or lower; in particular, it is conceivable that when at a time of transition, supercharging is performed with the W/G valve fully closed, the responsiveness is raised. However, in general, in the configuration of the foregoing conventional apparatus, the W/G valve is controlled to be slightly opened; therefore, at a time of transition, a W/G valve opening degree changing time, which is a time for fully closing a W/G valve, may be prolonged.

SUMMARY OF THE INVENTION

The present invention has been implemented in order to solve the foregoing problems in a conventional electric W/G valve controller; the objective thereof is to provide an electric W/G valve controller that can secure the high responsiveness and can reduce the power consumption.

An internal combustion engine wastegate valve controller according to the present invention is provided with a throttle valve provided in an intake path of an internal combustion engine; a supercharger having a turbine provided in an exhaust path of the internal combustion engine and a compressor that is provided at the upstream side of the throttle valve and rotates integrally with the turbine; a wastegate valve provided in a bypass that bypasses the turbine; a wastegate valve driving unit that drives the wastegate valve so as to change the flow path cross-sectional area of the bypass; an opening degree sensor that detects a changeable amount for the wastegate valve driving unit; and a rotation speed sensor that detects a rotation speed of the internal combustion engine. The internal combustion engine wastegate valve controller is characterized in that a desired wastegate valve opening degree is set in accordance with a driving condition of the internal combustion engine, in that based on the detected rotation speed of the internal combustion engine and the set desired wastegate valve opening degree, it is determined whether or not supercharging for the internal combustion engine is required, and in that in the case where it is determined that the supercharging is not required, a driving current for the wastegate valve driving unit is stopped when the opening degree of the wastegate valve becomes a desired value.

In an internal combustion engine wastegate valve controller according to the present invention, a desired wastegate valve opening degree is set in accordance with a driving condition of an internal combustion engine; based on a detected rotation speed of the internal combustion engine and a set desired wastegate valve opening degree, it is determined whether or not supercharging for the internal combustion engine is required; and in the case where it is determined that the supercharging is not required, a driving current for a wastegate valve driving unit is stopped when the opening degree of the wastegate valve becomes a desired value. Accordingly, even when it is determined that supercharging is not required, the time for changing the W/G valve in response to a transient demand can be reduced by setting the W/G valve at a position shifted toward the fully-closed position from the fully-opened position; furthermore, because the supply of the driving current to the wastegate valve driving unit is stopped, the power consumption can be reduced.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
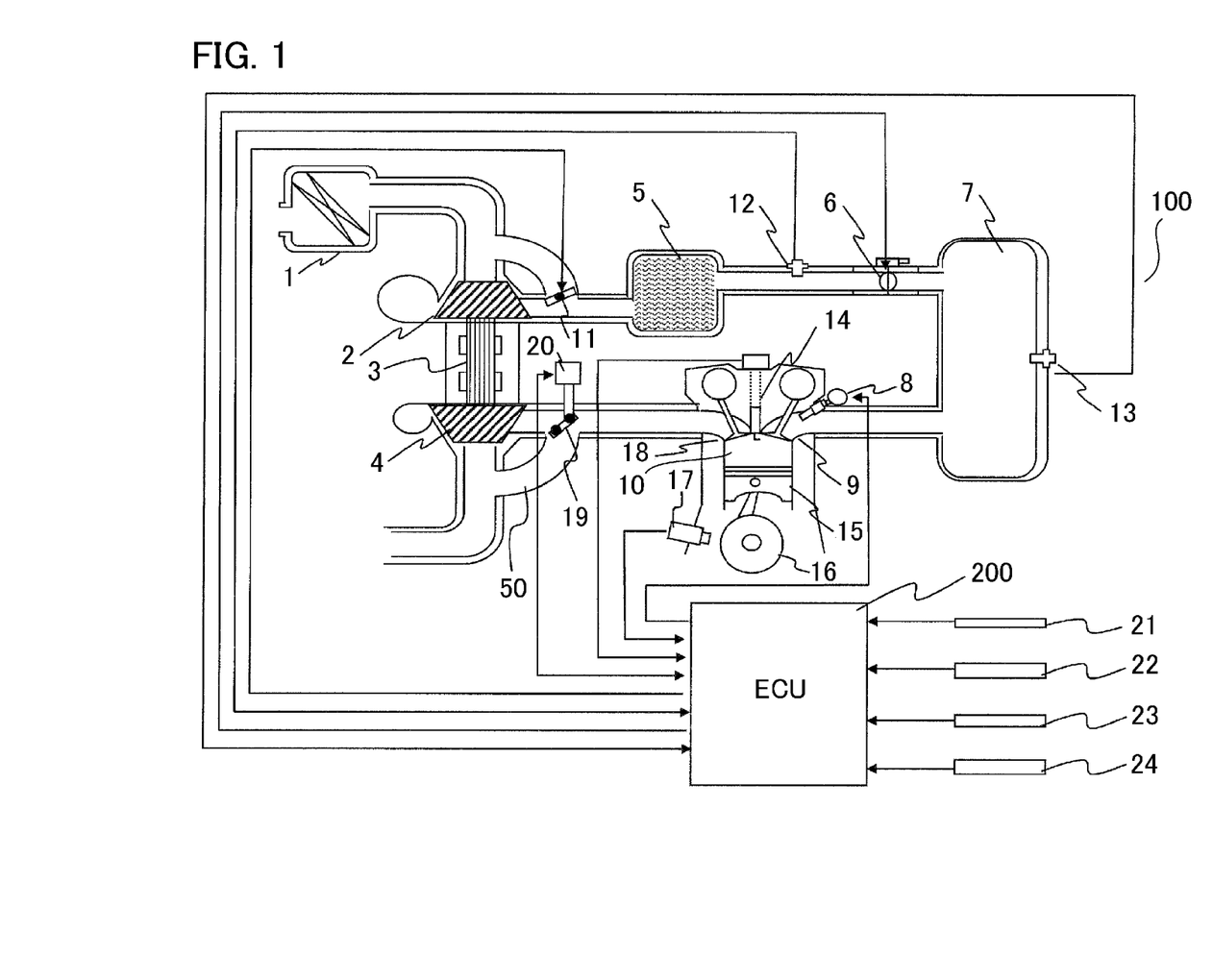
FIG. 1 is a configuration diagram representing an example of configuration of an internal combustion engine to which an internal combustion engine wastegate valve controller according to Embodiment 1 of the present invention is applied.

Hereinafter, an internal combustion engine wastegate valve controller according to Embodiment 1 of the present invention will be explained with reference to the drawings. FIG. 1 is a configuration diagram representing an example of configuration of an internal combustion engine to which an internal combustion engine wastegate valve controller according to Embodiment 1 of the present invention is applied. In FIG. 1, an air cleaner 1 leads the outer air to an internal combustion engine 100. The led outer air is supercharged through the rotation of a compressor 2. The compressor 2 is connected with an exhaust turbine 4 by way of a turbine shaft 3.

The exhaust turbine 4 is rotated by the energy of exhaust gas from the internal combustion engine 100. The outer air supercharged by the compressor 2 passes through an intercooler 5, a throttle valve 6 for adjusting the intake quantity, and a surge tank 7 and becomes a fuel-air mixture due to fuel injection from an injector 8; then, the fuel-air mixture is taken into a combustion chamber 10 through an intake valve 9. On the path along which the outer air is taken in, there are arranged an air bypass valve 11 for controlling the flow rate in a bypass connecting the upstream and the downstream of the compressor 2, a throttle valve upstream pressure sensor 12 for measuring the pressure at the upstream side of the throttle valve 6 (the pressure at the downstream side of the compressor 2), and an intake pipe inner pressure sensor 13 for measuring the pressure in the surge tank 7.

In this situation, the internal combustion engine 100 is systematized in such a way that the intake quantity is estimated based on the pressure ratio obtained from the respective outputs of the throttle valve upstream pressure sensor 12 and the intake pipe inner pressure sensor 13 and the effective aperture area obtained from the opening degree of the throttle valve 6. The provision of the throttle valve upstream pressure sensor 12 raises the accuracy of estimating the intake quantity.

The fuel-air mixture taken into the combustion chamber 10 is ignited through an ignition plug 14 to become combustion gas. A piston 15 is provided in the combustion chamber 10, and the piston 15 is connected with a crankshaft 16. The combustion gas makes the piston 15 reciprocate in the combustion chamber 10, so that the crankshaft 16 is rotated. An unillustrated crank plate is mounted on the crankshaft 16. Protrusions are provided in the crankshaft; by detecting the protrusions, a crank angle detection sensor 17 detects the rotation speed of the crankshaft 16 and the crank angle position.

The exhaust gas in the combustion chamber 10 is exhausted through the exhaust valve 18. The exhaust turbine 4 is driven by the exhausted exhaust gas so as to rotate and makes the compressor 2 rotate through the intermediary of the turbine shaft 3. There is provided a bypass 50 that connects the upstream side and the downstream side of the exhaust turbine 4; the quantity of exhaust gas that is led to the exhaust turbine 4 is adjusted by a W/G valve 19 disposed in the bypass 50.

The W/G valve 19 is coupled with a W/G valve actuator (referred to as an electric W/G valve actuator, hereinafter) 20 that is driven by a motor; when the electric W/G valve actuator is driven, the W/G valve 19 performs opening/closing operation, so that the quantity of exhaust gas in the bypass 50 is adjusted. In other words, the W/G valve 19 adjusts driving power for the exhaust turbine 4; thus, the pressure at the upstream side of the throttle valve 6 can arbitrarily be changed.

Figure 12:
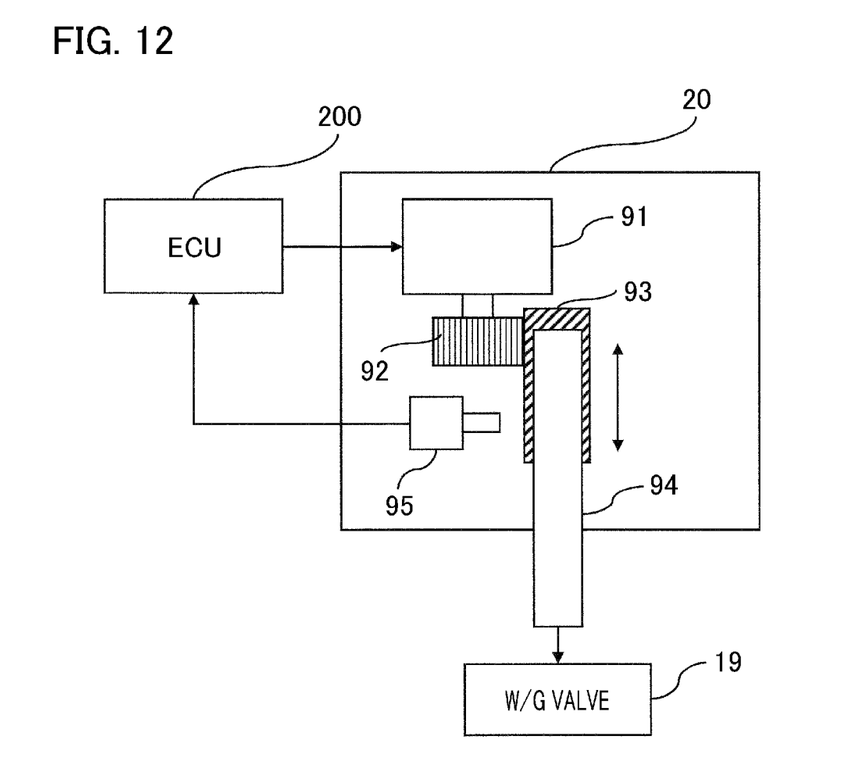
FIG. 12 is a configuration diagram representing the configuration of an electric wastegate valve actuator utilized in an internal combustion engine wastegate valve controller according to any one of Embodiments 1 and 2 of the present invention.

FIG. 12 is a configuration diagram representing the configuration of an electric wastegate valve actuator utilized in an internal combustion engine wastegate valve controller according to any one of Embodiments 1 and 2, described later, of the present invention. In FIG. 12, there is provided an electric motor 91 (simply referred to as a motor, hereinafter)

91, and a motor gear 92 is connected with the motor 91. The motor gear 92 is coupled with a screw mechanism 93; a rod 94 is connected with the screw mechanism 93.

In response to the rotation of the motor gear 92, the screw mechanism 93 operates, so that the rod 94 moves along the straight line indicated by an arrow. The front end of the rod 94 is connected with the W/G valve 19; when the rod 94 moves along the arrow, the W/G valve 19 is opened or closed. A position sensor 95 is provided in order to measure the position of the rod 94.

In the electric W/G valve actuator 20, a positive or a negative driving current is supplied to the motor 91 in response to an instruction from an ECU 200. When the driving current is supplied to the motor 91, the motor 91 is driven, and then the motor gear 92 rotates. When the motor gear 92 rotates, the screw mechanism 93 coupled with the motor gear 92 rotates; the rod 94 screw-coupled with the inside of the screw mechanism 93 moves along the straight line indicated by the arrow; then, the W/G valve 19 is opened or closed. Therefore, the output of the position sensor 95 that detects the position, in the straight-line direction, of the rod 94 can be utilized as a signal that indicates the W/G valve opening degree. Information based on the output of the position sensor 95 is transmitted to ECU 200 and is utilized for controlling the internal combustion engine.

In the electric W/G valve actuator 20 configured in such a manner as described above, the motor operates the rod 94 that directly acts on the W/G valve 19. The rod 94 that changes the opening degree of the W/G valve 19 is engaged with the motor gear; therefore, even when the supply of the driving current to the motor is stopped, the position of the W/G valve 19 is not likely to change, because of the engagement with the motor gear. The electric W/G valve actuator 20 is configured in such a way that even in the case where due to an ordinary exhaust stream, the position of the W/G valve 19 changes, the position thereof changes toward a position at which the W/G valve opens. Accordingly, by setting the opening degree of the W/G valve 19 at a desired position and stopping the supply of the driving current, the power consumption can be reduced.

Figure 13:
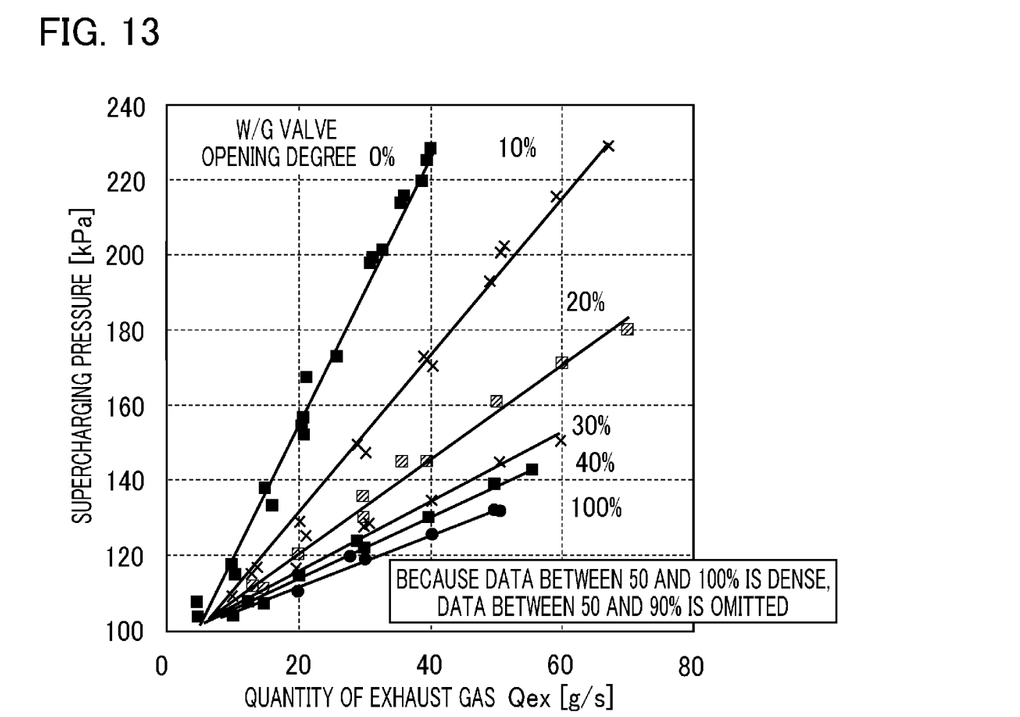
FIG. 13 is a characteristic graph representing the relationship between the supercharging pressure and the quantity of exhaust gas in the wastegate valve actuator in FIG. 12.

FIG. 13 is a characteristic graph representing the relationship between the supercharging pressure and the quantity of exhaust gas in the wastegate valve actuator in FIG. 12; FIG. 13 also represents the relationship between the opening degree of the W/G valve 19 and the supercharging condition. In FIG. 13, the ordinate denotes the supercharging pressure P2 [kPa], and the abscissa denotes the quantity of exhaust gas Qex[g/s]. Each of the straight lines in FIG. 13 represents the characteristic at a time when the opening degree of the W/G valve is 0[%], 10[%], 20[%], 40[%], or 100[%].

The quantity of exhaust gas Qex is the quantity of gas that flows toward the exhaust side, and is given by the equation (1) below.

$$Q_{ex} = Q_a \cdot \left(1 + \frac{1}{(AF)}\right) \quad (1)$$

where Qex, Qa, and AF are the quantity of exhaust gas[g/s], the quantity of intake air[g/s], and the ratio of air to fuel, respectively.

As described above, the compressor 2 that performs supercharging is coupled with the exhaust turbine 4 disposed in the exhaust path. Accordingly, the throttle upstream pressure (supercharging pressure P2) obtained through supercharging is in proportion to the quantity of exhaust gas that passes through the exhaust turbine 4. Because the quantity of exhaust gas that passes through the exhaust turbine 4 is adjusted by the W/G valve 19, the relationship between the quantity of exhaust gas Qex and the supercharging pressure P2 changes depending on the opening degree of the W/G valve 19.

As evident from FIG. 13, when the quantity of exhaust gas Qex is small, the supercharging pressure P2 at a time when the W/G valve opening degree is 100[%] and the supercharging pressure P2 at a time when the W/G valve opening degree is 40[%] are almost equal to each other. In other words, the supercharging condition at a time when the W/G valve is fully opened and the supercharging condition at a time when the W/G valve is half opened are almost equivalent to each other. Therefore, in a normal situation, even in the case where the W/G valve opening degree 100[%] is required, the W/G valve opening degree 40[%] provides the same effect when the quantity of exhaust gas is small. This characteristic is utilized and when a small quantity of exhaust gas is required, the W/G valve opening degree is set toward the closing side as much as possible, so that when at a time of transient requirement, the delay time in closing the W/G valve can be shortened.

In other words, the operation time for changing the W/G valve opening degree from 40[%] to 0[%] is shorter than the operation time for changing the W/G valve opening degree from 100[%] to 0[%]; therefore, when a small quantity of exhaust gas is required, the W/G valve opening degree is set toward the closing side as much as possible, e.g., to 40[%], so that at a time of transient requirement, a delay in the operation of closing the W/G valve 19 can be reduced. Accordingly, when exhaust gas is required, the W/G valve 19 is set toward the closing side as much as possible so that the high responsiveness to the requirement can be secured.

As illustrated in FIG. 1, to ECU 200, there are inputted signals from the throttle valve upstream pressure sensor 12, the intake pipe inner pressure sensor 13, the crank angle sensor 17, an intake air temperature sensor 21 that detects the temperature of intake air, a throttle position sensor 22 that detects the opening degree of the throttle valve 6, a water temperature sensor 23 that detects the coolant temperature of the internal combustion engine, an accelerator position sensor 24 that detects the amount of accelerator pedal depression by a driver, and the like. Based on these inputs, ECU 200 performs calculations with regard to the rotation speed and the ignition timing of the internal combustion engine, the fuel injection amount, the operation of the air bypass valve 11, the opening degree of the W/G valve 19, the operation of the electric W/G valve actuator 20, the operation of the throttle valve 6, and the like; then, based on the results of the calculations, ECU 200 controls the internal combustion engine.

Figure 2:
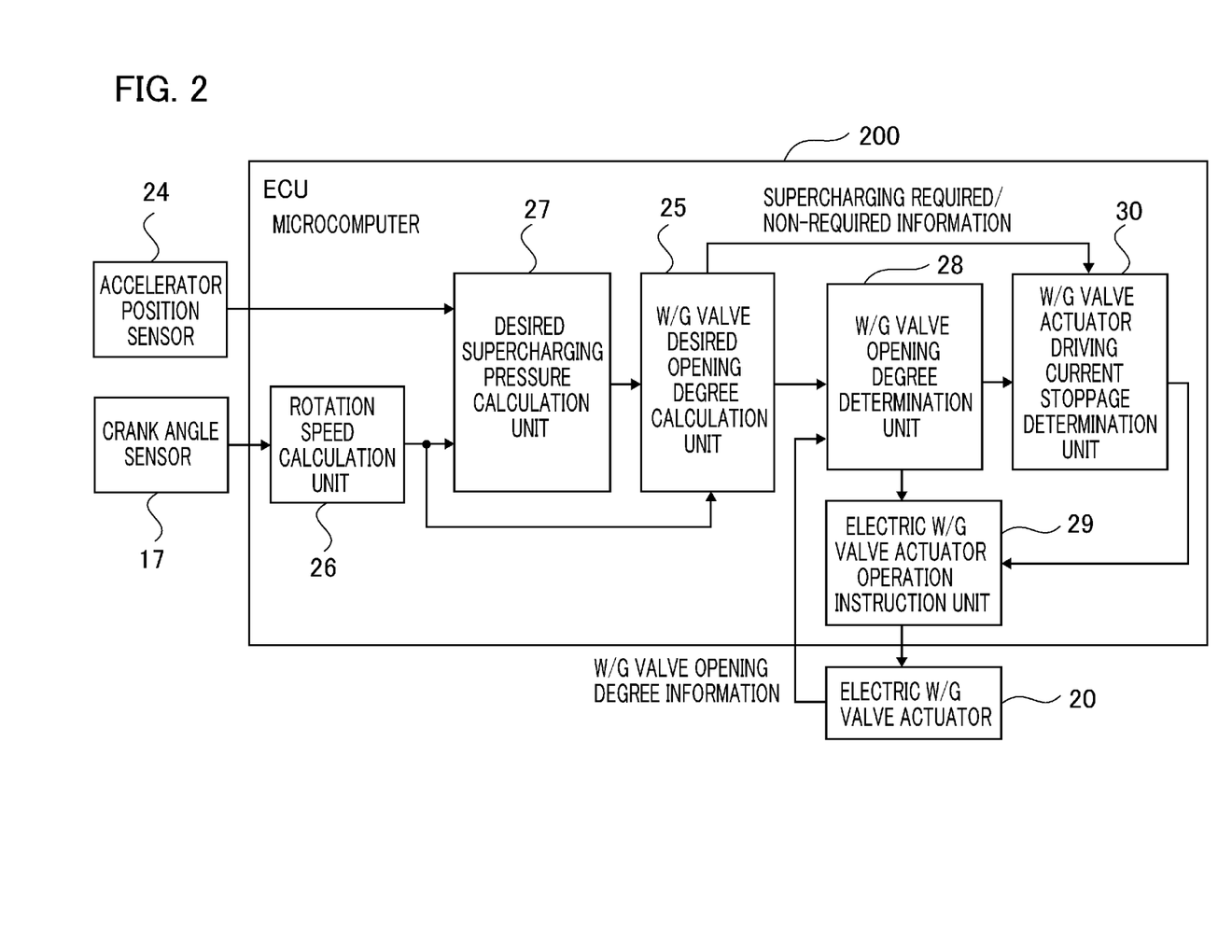
FIG. 2 is a block diagram representing an internal combustion engine wastegate valve controller according to Embodiment 1 of the present invention.

Next, the configuration of an internal combustion engine wastegate valve controller according to Embodiment 1 of the present invention will be explained. FIG. 2 is a block diagram representing an internal combustion engine wastegate valve controller according to Embodiment 1 of the present invention. In FIG. 2, an accelerator position sensor 24, a crank angle sensor 17, and ECU 200 correspond to the accelerator position sensor 24, the crank angle sensor 17, and ECU 200 in FIG. 1. ECU 200 is configured with unillustrated various I/F circuits and a microcomputer; the microcomputer is configured with an A/D converter for converting an analogue signal into a digital signal, a ROM region in which control programs and control constants are stored, a RAM region in which variables at a time when the programs are implemented are stored, and the like.

An internal combustion engine wastegate valve controller according to Embodiment 1 of the present invention is formed of the microcomputer in ECU 200 and is provided with a W/G valve desired opening degree calculation unit 25, a rotation speed calculation unit 26 that calculates the rotation speed of an internal combustion engine, a desired supercharging pressure calculation unit 27, a W/G valve opening degree determination unit 28, an electric W/G valve actuator operation instruction unit 29 that issues an operation instruction to the electric W/G valve actuator 20, and a W/G valve actuator current stoppage determination unit 30.

Figure 4:
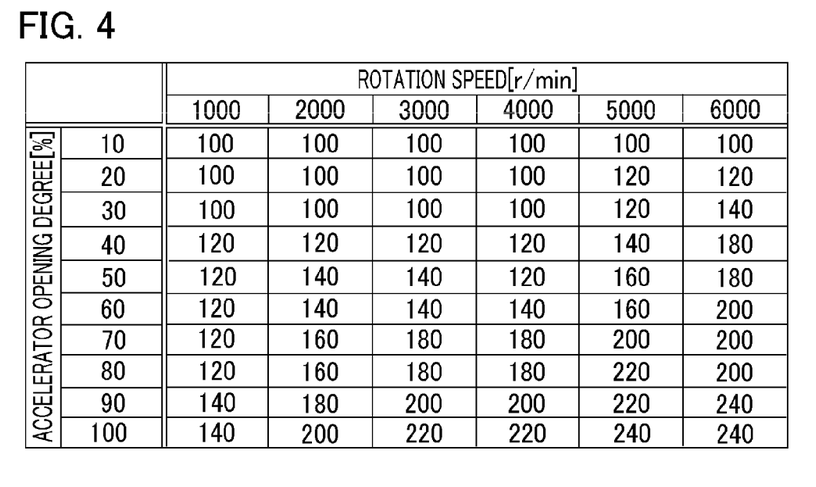
FIG. 4 is a map for the desired supercharging pressure utilized in an internal combustion engine wastegate valve controller according to Embodiment 1 of the present invention.

Firstly, based on the output of the crank angle sensor 17, the rotation speed calculation unit 26 calculates the rotation speed of the internal combustion engine and inputs the result of the calculation and the output of the accelerator position sensor 24 to the desired supercharging pressure calculation unit 27. The desired supercharging pressure calculation unit 27 calculates a desired supercharging pressure based on the inputted rotation speed of the internal combustion engine and the accelerator opening degree (the amount of accelerator pedal depression obtained from the accelerator position sensor 24). The desired supercharging pressure calculation unit 27 calculates the desired supercharging pressure, based on a map. FIG. 4 is a map for the desired supercharging pressure utilized in an internal combustion engine wastegate valve controller according to Embodiment 1 of the present invention.

As represented in FIG. 4, the desired supercharging pressure map is configured in such a way that based on the rotation speed and the accelerator opening degree, the desired supercharging pressure is obtained. Data pieces in the desired supercharging pressure map shown in FIG. 4 are each in units of, for example, [kPa]. The obtained desired supercharging pressure is also utilized for controlling units other than the W/G valve in the internal combustion engine.

The desired supercharging pressure obtained by the desired supercharging pressure calculation unit 27 is inputted to the W/G valve desired opening degree calculation unit 25. The W/G valve desired opening degree calculation unit 25 calculates the W/G valve desired opening degree, based on the outputs of the rotation speed calculation unit 26 and the desired supercharging pressure calculation unit 27, and determines whether or not supercharging is required. The W/G valve desired opening degree calculated by the W/G valve desired opening degree calculation unit 25 is inputted to the W/G valve opening degree determination unit 28.

The W/G valve opening degree determination unit 28 compares information on the present opening degree of the W/G valve 19 with the W/G valve desired opening degree inputted from the W/G valve desired opening degree calculation unit 25; in the case where the both values are different from each other, the W/G valve opening degree determination unit 28 sets a predetermined driving current for driving the electric W/G valve actuator 20 in such a way that the opening degree of the W/G valve 19 coincides with the W/G valve desired opening degree, and then instructs the electric W/G valve actuator operation instruction unit 29 to produce the set predetermined driving current.

The electric W/G valve actuator operation instruction unit supplies the predetermined current, produced through the instruction from the W/G valve opening degree determination unit 28, to the W/G valve actuator 20 so as to actuate the W/G valve actuator 20. Normally, feedback control is implemented until the difference between the desired opening degree and the actual opening degree falls within a driving current stoppage range. The driving current stoppage range is obtained from the desired W/G valve opening degree.

On the other hand, the result of the determination by the W/G valve desired opening degree calculation unit 25 on whether or not supercharging is required is inputted to the electric W/G valve actuator driving current stoppage determination unit 30. After the difference between the desired opening degree of the W/G valve 19 and the actual opening degree falls within the driving current stoppage range, the electric W/G valve actuator driving current stoppage determination unit 30 determines whether or not supercharging is required; in the case where supercharging is not required, the electric W/G valve actuator driving current stoppage determination unit 30 stops the supply of the driving current. Normally, the electric W/G valve actuator 20 is provided with a control dead zone, regardless of the foregoing control, and when the difference between the desired opening degree and the actual opening degree is smaller than the dead zone, the supply of the driving current is stopped; however, in the foregoing control by the electric W/G valve actuator driving current stoppage determination unit 30, the detection range for the opening side is set wider than the dead zone, for the purpose of stopping the supply of the driving current at an earlier timing.

The processing represented in FIG. 2 is performed in the cycle of, for example, 10 [ms].

Figure 3:
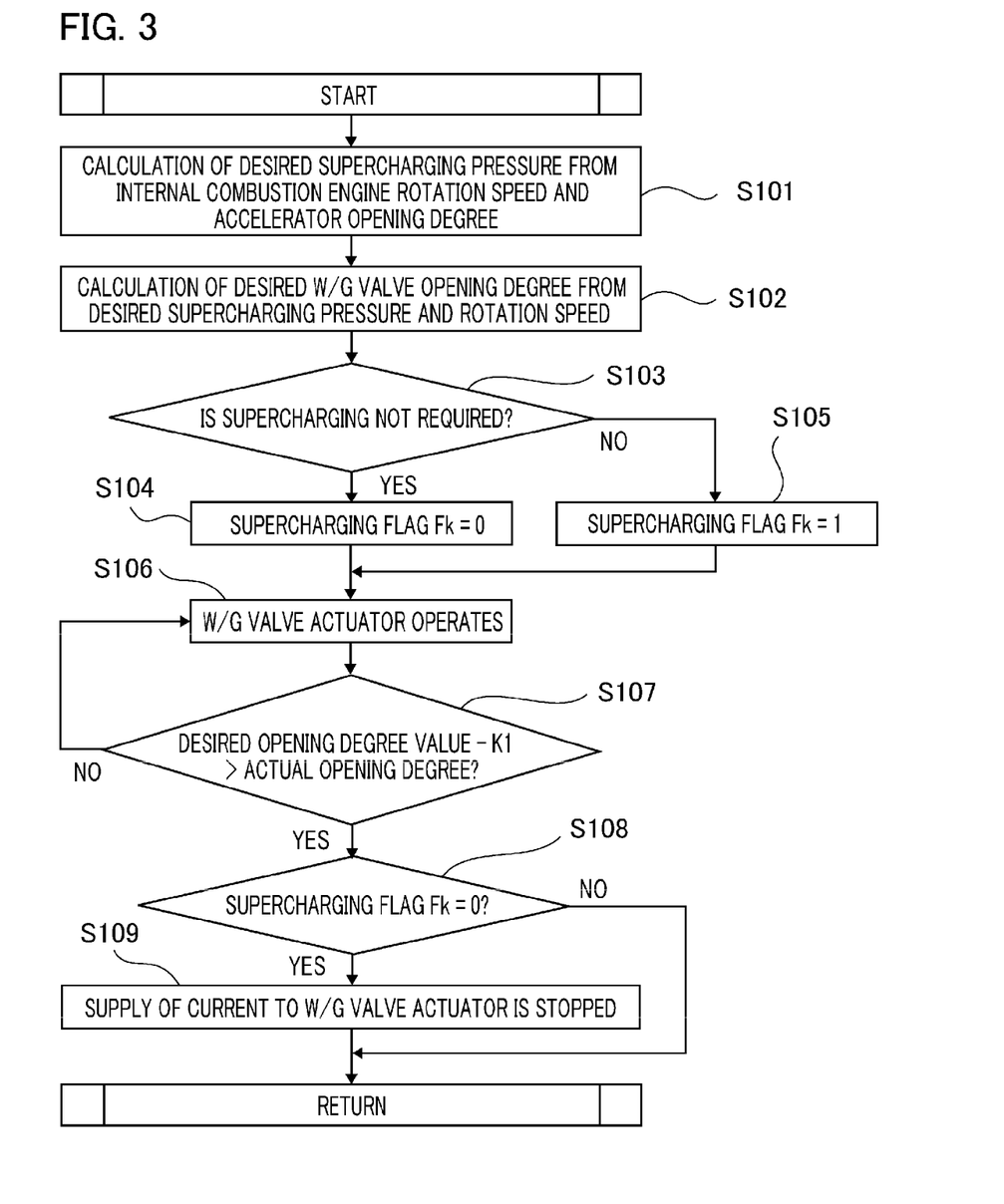
FIG. 3 is a flowchart representing the operation of an internal combustion engine wastegate valve controller according to Embodiment 1 of the present invention.

Next, the operation of an internal combustion engine wastegate valve controller according to the present invention will be explained with reference to a flowchart. FIG. 3 is a flowchart representing the operation of an internal combustion engine wastegate valve controller according to Embodiment 1 of the present invention; the flowchart represents processing in which a desired supercharging pressure is calculated and an electric W/G valve actuator is operated so that the W/G valve opening degree is controlled; for example, the control of the W/G valve opening degree is performed through interrupt processing of a 10 [ms] cycle.

At first, in the step S101, a desired supercharging pressure Pt is calculated from the internal combustion engine rotation speed and the accelerator opening degree. The internal combustion engine rotation speed is obtained through the crank angle sensor 17, and the accelerator opening degree is obtained through the accelerator position sensor 24. For example, such a map as represented in FIG. 4 for the relationship between the acceleration opening degree and the internal combustion engine rotation speed is preliminarily prepared, and then the desired supercharging pressure Pt is obtained from the internal combustion engine rotation speed and the accelerator opening degree. For example, in the case where the internal combustion engine rotation speed is 2000 [r/min] and the accelerator opening degree is 50[%], the desired supercharging pressure Pt of 140 [kPa] is obtained from the map in FIG. 4. The desired supercharging pressure may be obtained through another method.

Figure 5:
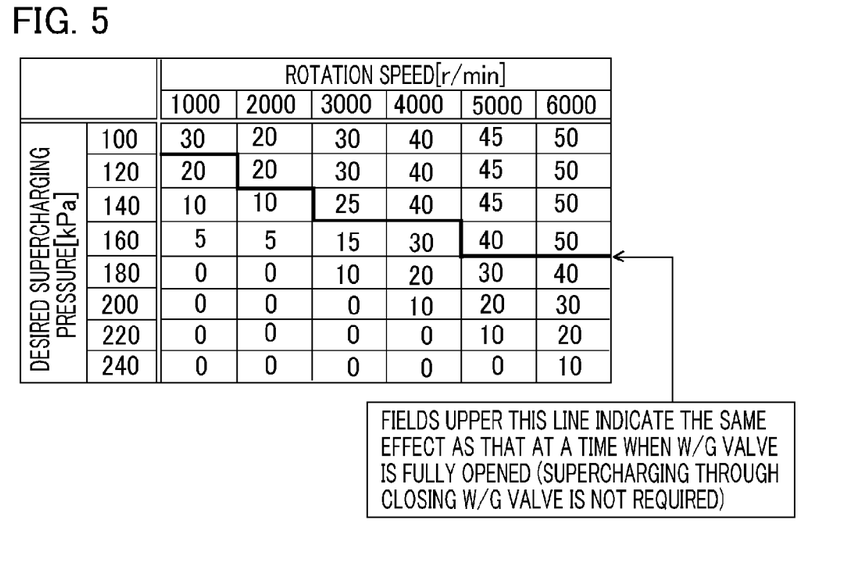
FIG. 5 is a map for the desired wastegate valve opening degree utilized in an internal combustion engine wastegate valve controller according to Embodiment 1 of the present invention.

Next, in the step S102, the desired W/G valve opening degree is calculated from the internal combustion engine rotation speed and the desired supercharging pressure Pt. FIG. 5 is a map for the desired wastegate valve opening degree utilized in an internal combustion engine wastegate valve controller according to Embodiment 1 of the present invention. For example, there is preliminarily prepared such a map as represented in FIG. 5 for obtaining a desired wastegate valve opening degree based on the desired supercharging pressure and the internal combustion engine rotation speed, and then the desired W/G valve opening degree is obtained from this map. For example, in the case where the internal combustion engine rotation speed is 2000 [r/min] and the desired supercharging pressure is 140 [kPa], the desired W/G valve opening degree of 10[%] is obtained from the map in FIG. 5. Obtaining the desired W/G valve opening degree from the desired supercharging pressure makes it possible that instead of the present measurement data, a desired driving condition is anticipated and controlled.

Next, it is determined in the step S103 whether or not supercharging is required. For example, as represented in FIG. 5, in the case where the desired supercharging pressure is 100 [kPa], the desired W/G valve opening degree for each rotation speed provides the same effect as that at a time when the W/G valve is fully opened; therefore, it is determined that supercharging through closing of the W/G valve is not required. Similarly, the desired W/G valve opening degrees 20[%] through 50[%] for the rotation speeds 2000 [rpm] through 6000 [rpm] at a time when the desired supercharging pressure is 120 [kPa], the desired W/G valve opening degrees 25[%] through 50[%] for the rotation speeds 3000 [rpm] through 6000 [rpm] at a time when the desired supercharging pressure is 140 [kPa], and the desired W/G valve opening degrees 40[%] through 50[%] for the rotation speeds 5000 [rpm] through 6000 [rpm] at a time when the desired supercharging pressure is 160 [kPa] provide the same effect as that at a time when the W/G valve is fully opened; therefore, it is determined that supercharging through closing of the W/G valve is not required. In other words, in the case where in FIG. 5, the desired W/G valve opening degree exists in a column (a hatched column) that is above the bold solid line, it is determined that supercharging is not required.

In such a way as described above, it is determined whether or not supercharging is required, based on the rotation speed and the desired W/G valve opening degree. Even when as represented in FIG. 5, supercharging is not required, the time for changing the W/G valve in response to a transient demand can be reduced by setting the W/G valve opening degree at the closing side.

In the case where it is determined in the step S103 that supercharging is not required (Yes), the step S103 is followed by the step S104, where a supercharging flag Fk is set to "0"; in the case where it is determined in the step S103 that supercharging is required (No), the step S103 is followed by the step S105, where the supercharging flag Fk is set to "1".

Next, in the step S106, the electric W/G valve actuator is operated in accordance with the desired W/G valve opening degree.

Figure 6:
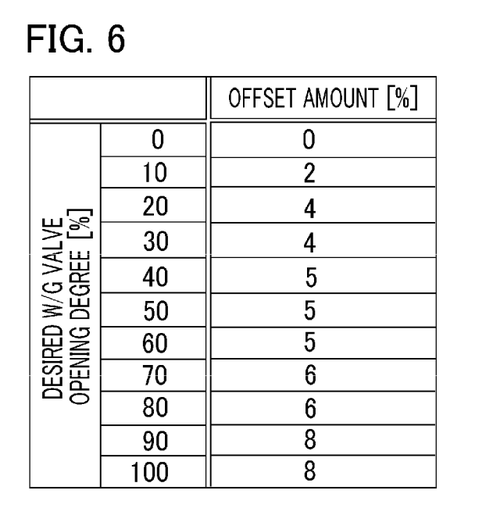
FIG. 6 is a table for the driving current stoppage offset value in an internal combustion engine wastegate valve controller according to Embodiment 1 of the present invention.

In the step S107, it is determined whether or not the desired W/G valve opening degree−K1>the actual W/G valve opening degree. K1 denotes a driving current stoppage determination offset amount. FIG. 6 is a table for the driving current stoppage offset value in an internal combustion engine wastegate valve controller according to Embodiment 1 of the present invention. As represented by a table in FIG. 6, the offset amount [%] is set in accordance with the desired W/G valve opening degree. For example, when the desired W/G valve opening degree is 10[%], the offset amount is set to 2[%]. Because the driving current stoppage determination offset amount is set in accordance with the desired W/G valve opening degree, the offset amount can be set to an appropriate value even when the desired W/G valve opening degree is small. The table in FIG. 6 configures a driving current stoppage determination offset value calculation unit according to the present invention.

In Embodiment 1, in order to set the driving current stoppage determination offset amount, a table is utilized; however, another method may be utilized.

In the case where it is determined in the step S107 that the desired W/G valve opening degree−K1>the actual W/G valve opening degree, the step S107 is followed by the step S108; in other cases, the step S106 is resumed.

In the step S108, it is determined whether or not the supercharging flag Fk is "0". In the case where the supercharging flag Fk is "0" (Yes), the step S108 is followed by the step S109; in the case where the supercharging flag Fk is not "0" (No), the step S101 is resumed. In such a way as described above, the W/G valve actuator is feedback-controlled until the desired W/G valve opening degree is achieved.

In the step S109, the supply of the driving current to the electric W/G valve actuator is stopped; then, the processing is ended.

Figure 7:
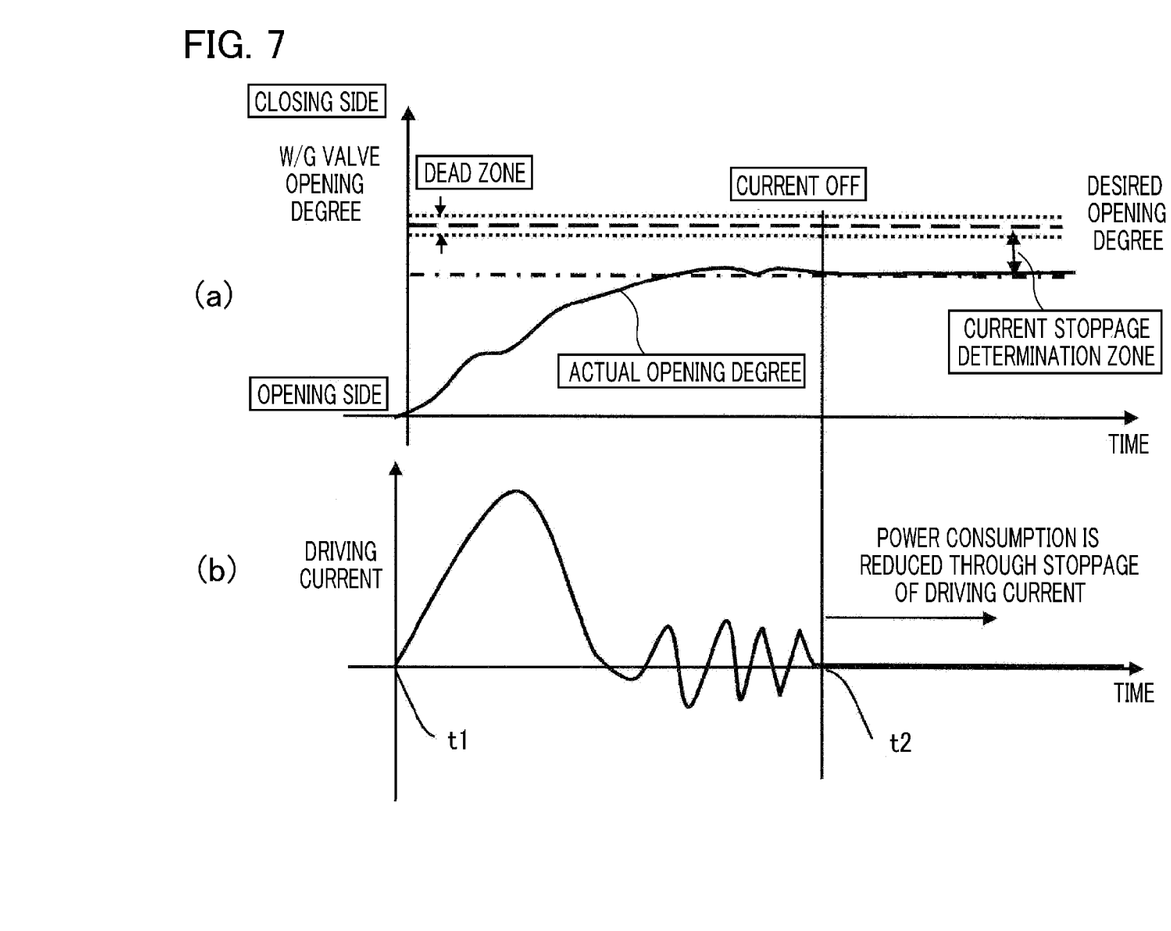
FIG. 7 is a set of graphs representing the respective behaviors of the desired wastegate valve opening degree and the electric wastegate valve actuator driving current in an internal combustion engine wastegate valve controller according to Embodiment 1 of the present invention.

FIG. 7 is a set of graphs representing the respective behaviors of the desired wastegate valve opening degree and the electric wastegate valve actuator driving current in an internal combustion engine wastegate valve controller according to Embodiment 1 of the present invention; FIG. 7(a) represents the change in the W/G valve opening degree; the ordinate denotes the W/G valve opening degree (the upward direction is the closing side, and the downward direction is the opening side), and the abscissa denotes the time. FIG. 7(b) is a waveform chart of the driving current for the electric W/G valve actuator; ordinate denotes the driving current, and the abscissa denotes the time.

In FIG. 7(a), the solid line denotes the W/G valve opening degree, the broken line denotes the desired opening degree; the dashed line denotes the current stoppage determination line; and the zone between the dotted lines denotes the control dead zone, i.e., a zone in which when the actual opening degree is within the dead zone with respect to the desired opening degree, no current is applied. The current stoppage determination line (range) represented by the dashed line is set to be wider than the control dead zone. The control for the dead zone represented by the dotted lines is performed through a control method other than the W/G valve control described in Embodiment 1.

As represented in FIG. 7, the W/G valve opening degree changes in accordance with the driving current for the electric W/G valve actuator. The driving current is proportional to the difference between the W/G valve opening degree and the desired W/G valve opening degree. When the positive current flows, the electric W/G valve actuator operates toward the closing side; when the negative current flows, the electric W/G valve actuator operates toward the opening side. At a time t1 in FIG. 7(a), the difference between the desired W/G valve opening degree represented by the broken line and the W/G valve actual opening degree represented by the solid line is large. Accordingly, as represented in FIG. 7(b), the driving current for the electric W/G valve actuator increases in the positive side from the time t1, and the W/G valve is driven toward the closing side.

When because the W/G valve is driven toward the closing side, the difference between the desired W/G valve opening degree and the W/G valve actual opening degree becomes small, the driving current for the electric W/G valve actuator also becomes small; then, as represented in FIG. 7(b), the driving current is finely adjusted toward the positive or the negative side. At a time t2 when the W/G valve opening degree is within the current stoppage determination zone represented in FIG. 7(a), it is determined that the W/G valve opening degree is within the current stoppage zone; then, the driving current for the electric W/G valve actuator is stopped, so that the power consumption is reduced.

Speaking more specifically, in an internal combustion engine provided with a supercharger, W/G valve opening degrees at which the supercharging condition does not change from the supercharging condition at a time the W/G valve is fully opened are preliminarily measured and mapped, and the desired W/G valve opening degree is set in accordance with the desired supercharging pressure. In the case where the required torque is small and the desired W/G valve opening degree becomes a W/G valve opening degree at which the supercharging condition does not change from the supercharging condition at a time when the W/G valve is fully opened, the supply of the driving current to the electric W/G valve actuator is stopped at a time when the W/G valve actual opening degree becomes approximately the same as the desired W/G valve opening degree. As described above, because the W/G valve actual opening degree is set not at a position where the W/G valve is fully opened but at a position in the closing side, a high responsiveness can be secured even when a transient demand exists, and because the supply of the driving current to the electric W/G valve actuator is stopped, the power consumption can be reduced.

In addition, when the difference between the desired W/G valve opening degree and the W/G valve actual opening degree for the driving current stoppage determination is set to be large, the time during which the supply of the driving current is stopped is prolonged, thereby reducing the power consumption more.

Embodiment 2

Figure 8:
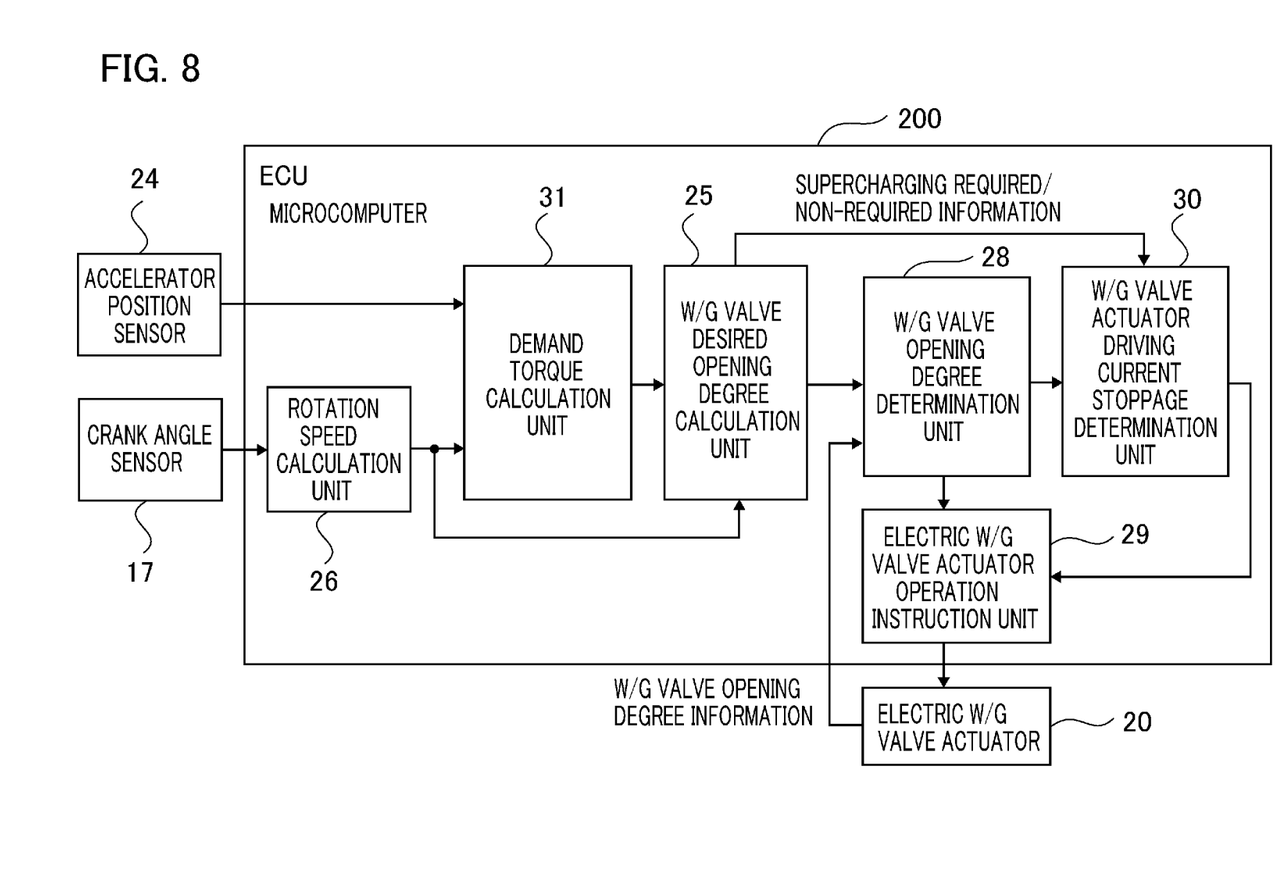
FIG. 8 is a block diagram representing an internal combustion engine wastegate valve controller according to Embodiment 2 of the present invention.

Next, an internal combustion engine wastegate valve controller according to Embodiment 2 of the present invention will be explained. As is the case with Embodiment 1, an internal combustion engine wastegate valve controller according to Embodiment 2 is utilized in the internal combustion engine illustrated in FIG. 1. FIG. 8 is a block diagram representing an internal combustion engine wastegate valve controller according to Embodiment 2 of the present invention. In the internal combustion engine wastegate valve controller, represented in FIG. 8, according to Embodiment 2 of the present invention, the desired supercharging pressure calculation unit 27 in the block diagram of FIG. 2 explained in Embodiment 2 is replaced by a demand torque calculation unit 31. The other configurations are the same as those in Embodiment 1 represented in FIG. 2.

Figure 10:
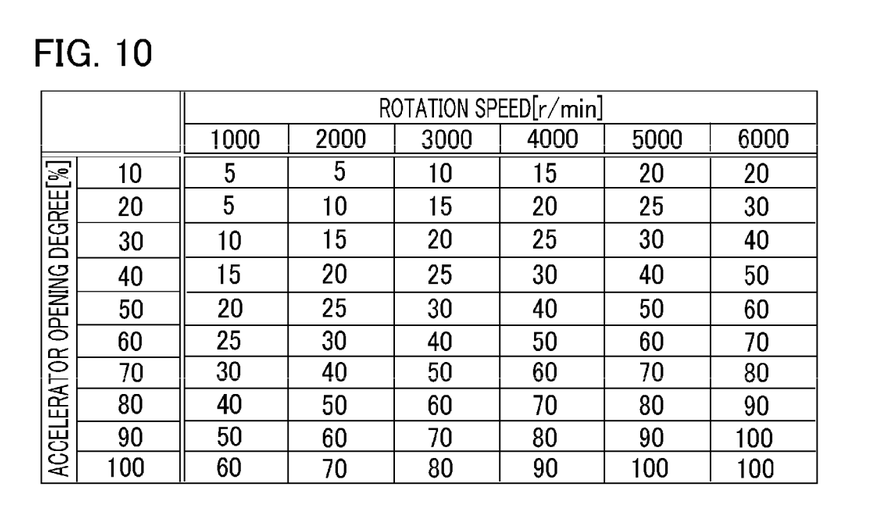
FIG. 10 is a map for the demand torque utilized in an internal combustion engine wastegate valve controller according to Embodiment 2 of the present invention.

In FIG. 8, the demand torque calculation unit 31 calculates a demand torque, based on the output of the accelerator position sensor 24 and the output of the rotation speed calculation unit 26, which are inputted thereto. The demand torque calculation unit 31 calculates the demand torque, based on a map. FIG. 10 is a map for the demand torque utilized in an internal combustion engine wastegate valve controller according to Embodiment 2 of the present invention. As represented in FIG. 10, the map is configured with the rotation speed and the accelerator opening degree (the amount of accelerator pedal depression obtained from the accelerator position sensor); a demand torque is obtained from both the data items. The data items in the map are in units of [N·m]. The obtained demand torque is also utilized for controlling units other than the W/G valve in the internal combustion engine.

The demand torque obtained in such a manner as described above is inputted to the W/G valve desired opening degree calculation unit 25; then, a W/G valve desired opening degree is calculated. The W/G valve desired opening degree calculation unit 25 not only calculates a desired opening degree but also determines whether or not supercharging is required. The result of the calculation of a W/G valve desired opening degree is inputted to the W/G valve opening degree determination unit 28; in the case where information on the present W/G valve opening degree and the desired opening degree is different from each other, a predetermined driving current is set and an instruction is issued to the electric W/G valve actuator operation instruction unit 29. Information about the result of the determination on whether or not supercharging is inputted to the electric W/G valve actuator driving current stoppage determination unit 30. The operation thereafter is the same as that in Embodiment 1 described above; therefore, the explanation therefor will be omitted. These processing items are performed in the cycle of, for example, 10 [ms].

Figure 9:
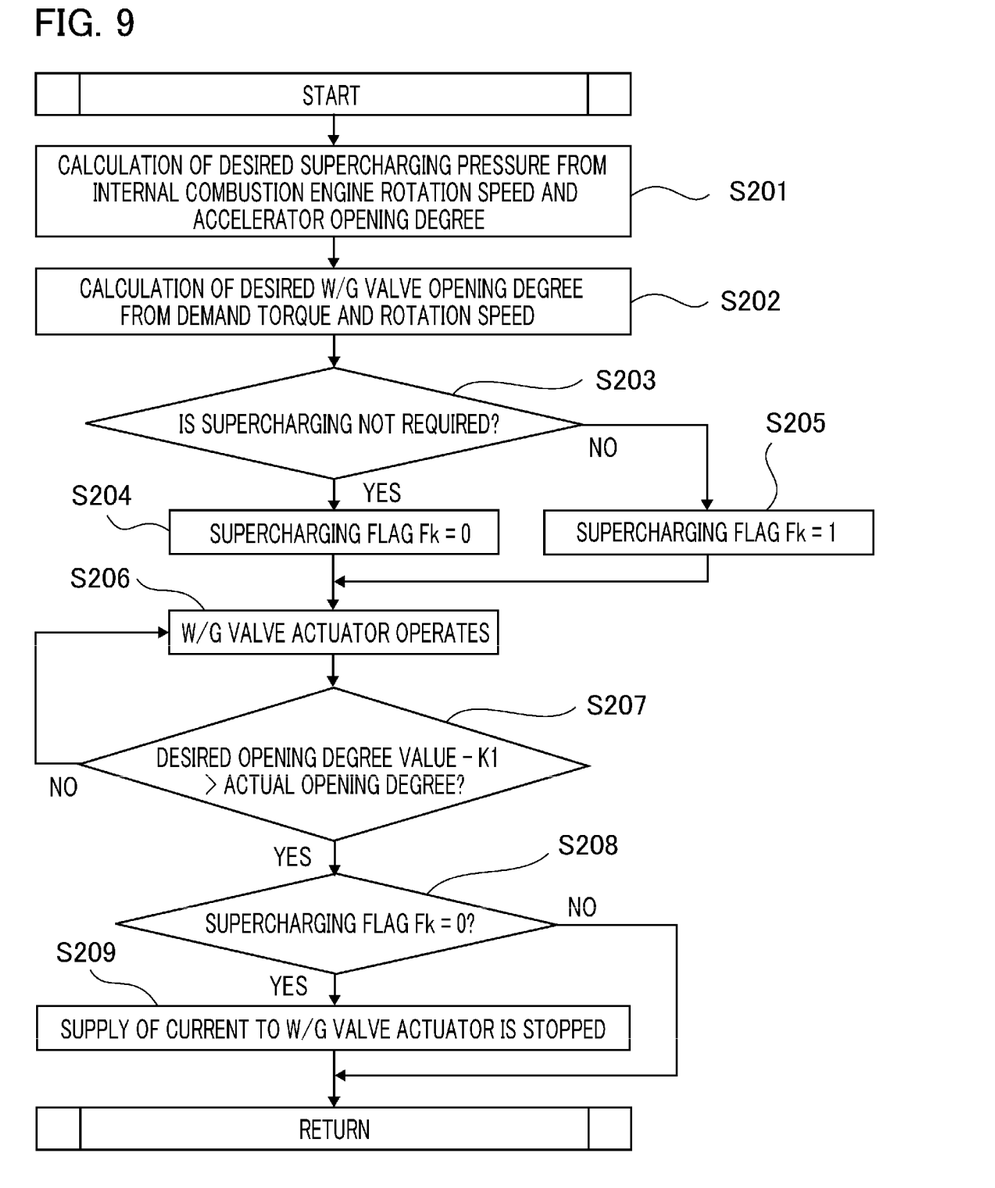
FIG. 9 is a flowchart representing the operation of an internal combustion engine wastegate valve controller according to Embodiment 2 of the present invention.

Next, the operation of an internal combustion engine wastegate valve controller according to Embodiment 2 of the present invention will be explained with reference to a flowchart. FIG. 9 is a flowchart representing the operation of an internal combustion engine wastegate valve controller according to Embodiment 2 of the present invention. The flowchart in FIG. 9 represents processing in which a demand torque is calculated and then the W/G valve actuator 20 is actuated so that the opening degree of the W/G valve 19 is controlled; for example, the control of the W/G valve opening degree is performed through interrupt processing of a 10 [ms] cycle.

In FIG. 9, at first, in the step S201, a demand torque Tt is obtained from the internal combustion engine rotation speed and the accelerator opening degree. The internal combustion engine rotation speed is obtained from the output of the crank angle sensor 17, and the accelerator opening degree is obtained from the output of the accelerator position sensor 24. Such a map as represented in FIG. 10 is preliminarily prepared, and then the demand torque is obtained from the map, based on the internal combustion engine rotation speed and the accelerator opening degree. For example, in the case where the internal combustion engine rotation speed is 2000 [r/min] and the accelerator opening degree is 50[%], the demand torque Tt of 25 [N·m] is obtained from the map in FIG. 10. The demand torque Tt may be obtained through another method.

Figure 11:
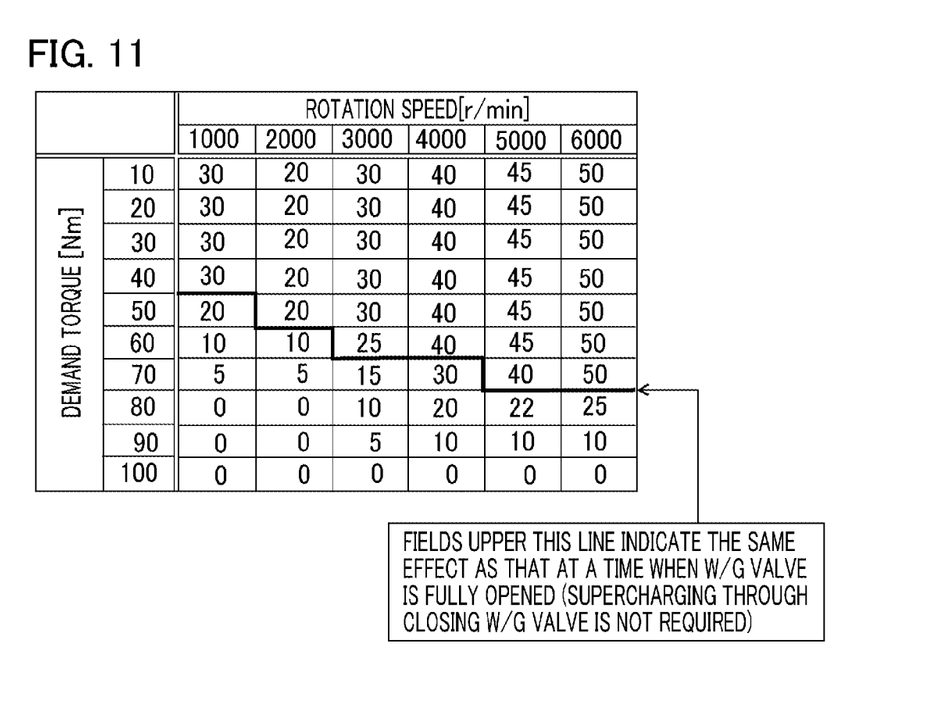
FIG. 11 is a map for the desired wastegate valve opening degree utilized in an internal combustion engine wastegate valve controller according to Embodiment 2 of the present invention.

Next, in the step S202, the desired W/G valve opening degree is calculated from the internal combustion engine rotation speed and the demand torque Tt. The desired W/G valve opening degree is calculated, for example, by use of a map. FIG. 11 is a map for the desired wastegate valve opening degree utilized in an internal combustion engine wastegate valve controller according to Embodiment 2 of the present invention. FIG. 11 is a map configured for the purpose that the desired W/G valve opening degree is calculated from the internal combustion engine rotation speed and the demand torque. For example, in the case where the internal combustion engine rotation speed is 2000 [r/min] and the demand torque is 20 [N·m], the desired W/G valve opening degree of 20[%] is obtained from the map in FIG. 11. The desired W/G valve opening degree may be obtained through another method.

Next, it is determined in the step S203 whether or not supercharging is required. For example, as represented in FIG. 11, in the case where the demand torque is from 10 [N·m] to 40 [N·m], the desired W/G valve opening degree for each rotation speed provides the same effect as that at a time when the W/G valve is fully opened; therefore, it is determined that supercharging through closing of the W/G valve is not required. Similarly, the desired W/G valve opening degrees 20[%] through 50[%] for the rotation speeds 2000 [rpm] through 6000 [rpm] at a time when the demand torque is 50 [N·m], the desired W/G valve opening degrees 25[%] through 50[%] for the rotation speeds 3000 [rpm] through 6000 [rpm] at a time when the demand torque is 60 [N/m], and the desired W/G valve opening degrees 40[%] through 50[%] for the rotation speeds 5000 [rpm] through 6000 [rpm] at a time when the demand torque is 70 [N/m] provide the same effect as that at a time when the W/G valve is fully opened; therefore, it is determined that supercharging through closing of the W/G valve is not required. In other words, in the case where in FIG. 11, the desired W/G valve opening degree exists in a column (a hatched column) that is above the bold solid line, it is determined that supercharging is not required.

In such a way as described above, it is determined whether or not supercharging is required, based on the rotation speed and the demand torque. Even when as represented in FIG. 11, supercharging is not required, the time for changing the W/G valve in response to a transient demand can be reduced by setting the W/G valve opening degree at the closing side.

In the case where it is determined in the step S203 that supercharging is not required (Yes), the step S203 is followed by the step S204, where the supercharging flag Fk is set to "0"; in the case where it is determined in the step S203 that supercharging is required (No), the step S203 is followed by the step S205, where the supercharging flag Fk is set to "1".

The operation from the step S206 to the step S209 is the same as the operation from the step S106 to the step S109 in FIG. 3 of Embodiment 1; therefore, the explanation therefor will be omitted.

In the foregoing internal combustion engine wastegate valve controller according to Embodiment 2 of the present invention, because the desired W/G valve opening degree is set based on the demand torque, which can readily be utilized in other controls, a high responsiveness can be secured even when a transient demand exists, and because the supply of the driving current to the electric W/G valve actuator is stopped, the power consumption can be reduced.

Various modifications and alterations of this invention will be apparent to those skilled in the art without departing from the scope and spirit of this invention, and it should be understood that this is not limited to the illustrative embodiments set forth herein.

What is claimed is:

1. A system comprising:
   a throttle valve provided in an intake path of an internal combustion engine;
   a turbocharger having a turbine provided in an exhaust path of the internal combustion engine and a compressor that is provided at the upstream side of the throttle valve and rotates integrally with the turbine;
   a wastegate valve provided in a bypass that bypasses the turbine;
   a wastegate valve actuator that drives the wastegate valve so as to change the flow path cross-sectional area of the bypass;
   an opening degree sensor that detects a changeable amount for the wastegate valve actuator;
   a rotation speed sensor that detects a rotation speed of the internal combustion engine; and
   a controller comprising control circuitry configured to implement:
      a wastegate valve desired opening degree calculation unit that
         sets a desired opening degree of the wastegate valve in accordance with a driving condition of the internal combustion engine, and
         determines, based on the detected rotation speed of the internal combustion engine and the set desired opening degree of the wastegate valve, whether or not supercharging air for the internal combustion engine is required; and
      a wastegate valve actuator driving current stoppage determination unit that
         stops, in the case where it is determined that the supercharging air is not required, a driving current for the wastegate valve driving unit in response to the opening degree of the wastegate valve becoming the set desired opening degree of the wastegate valve, and
         changes an offset value for a driving current stoppage determination in accordance with the set desired opening degree of the wastegate valve.

2. The system according to claim 1, wherein the control circuitry is further configured to implement:
   an accelerator opening degree detection unit that detects an opening degree of an accelerator of the internal combustion engine; and
   a desired supercharging pressure calculation unit that calculates a desired supercharging air pressure from the rotation speed of the internal combustion engine and the opening degree of the accelerator,
   wherein the desired opening degree of the wastegate valve is set in accordance with the detected rotation speed and the calculated desired supercharging air pressure.

3. The system according to claim 1, wherein the control circuitry is further configured to implement:
   an accelerator opening degree detection unit that detects an opening degree of an accelerator of the internal combustion engine; and
   a demand torque calculation unit that calculates a demand torque of the internal combustion engine from the rotation speed of the internal combustion engine and the opening degree of the accelerator,
   wherein the desired opening degree of the wastegate valve is set in accordance with the detected rotation speed and the calculated demand torque.

* * * * *